(12) United States Patent
Fukushima (10) Patent No.: US 10,630,864 B2
(45) Date of Patent: Apr. 21, 2020

(54) IMAGE FORMING APPARATUS, IMAGE FORMING SYSTEM, AND COMMUNICATION PROCESSING METHOD ALLOWING LOG STORAGE OF REMOTE MAINTENANCE CONNECTION

(71) Applicant: KYOCERA Document Solutions Inc., Osaka (JP)

(72) Inventor: Keisuke Fukushima, Concord, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/967,083

(22) Filed: Apr. 30, 2018

(65) Prior Publication Data
US 2019/0335058 A1    Oct. 31, 2019

(51) Int. Cl.
H04N 1/32     (2006.01)
H04L 7/00     (2006.01)
H04L 9/30     (2006.01)

(52) U.S. Cl.
CPC ....... *H04N 1/32358* (2013.01); *H04L 7/0016* (2013.01); *H04L 9/30* (2013.01); *H04N 2201/3202* (2013.01)

(58) Field of Classification Search
CPC ....... H04N 1/32358; H04N 2201/3202; H04N 1/32
See application file for complete search history.

(56) References Cited

U.S. PATENT DOCUMENTS

| | | | |
|---|---|---|---|
| 2005/0080915 A1* | 4/2005 | Shoemaker | H04L 29/06027 709/231 |
| 2007/0103715 A1* | 5/2007 | Nakata | G06F 3/1203 358/1.14 |
| 2008/0130884 A1* | 6/2008 | Matsumoto | H04N 1/00244 380/200 |
| 2009/0296136 A1* | 12/2009 | Tanaka | G06F 21/606 358/1.15 |
| 2010/0091114 A1* | 4/2010 | Ito | H04N 1/00127 348/207.1 |
| 2016/0191723 A1* | 6/2016 | Yue | H04N 1/00209 358/1.15 |
| 2017/0214824 A1* | 7/2017 | Ooba | H04L 41/085 |
| 2017/0264760 A1* | 9/2017 | Sato | H04N 1/00061 |
| 2018/0097949 A1* | 4/2018 | Mochizuki | H04L 67/141 |
| 2018/0198870 A1* | 7/2018 | Fukushima | H04L 67/141 |

FOREIGN PATENT DOCUMENTS

JP  2007-115039 A    5/2007
JP  2007115039 A  *  5/2007

\* cited by examiner

*Primary Examiner* — Ted W Barnes
(74) *Attorney, Agent, or Firm* — Hawaii Patent Services; Nathaniel K. Fedde; Kenton N. Fedde (57) ABSTRACT

Provided is an image forming apparatus that can acquire a log at the time of connection with a support terminal of remote maintenance service. The image forming apparatus includes a connecting part, an operation acquiring part, and a log acquiring part. The connecting part connects with the support terminal in a session of a specific protocol. The operation acquiring part acquires operational information corresponding to operation of the support terminal connected by the connecting part. The log acquiring part acquires log information, which is acquired in the support terminal, with the same session as the operational information acquired by the operation acquiring part.

16 Claims, 6 Drawing Sheets

IMAGE FORMING APPARATUS, IMAGE FORMING SYSTEM, AND COMMUNICATION PROCESSING METHOD ALLOWING LOG STORAGE OF REMOTE MAINTENANCE CONNECTION

BACKGROUND

The present disclosure relates to an image forming apparatus, an image forming system, and a communication processing method, especially is associated with the image forming apparatus, the image forming system, and the communication processing method, which enables remote maintenance.

An image forming apparatus, such as an MFP (Multi-Functional Peripheral), is used to print a document and an image.

As typical technology, a system enabling remote control of MFP with combining a VNC server (MFP) and a VNC viewer (PC operated with remote control) exists. In this system, it is made not to display security information, such as a user ID, a password, or the like, inputted by the remote control, on local UI (the operational panel in MFP).

SUMMARY

An image forming apparatus in the present disclosure includes a connecting part that connects with a terminal for remote maintenance in a session of a specific protocol; an operation acquiring part that acquires operational information corresponding to operation of the terminal connected by the connecting part; a log acquiring part which acquires log information from the terminal in the same session as the operational information acquired by the operation acquiring part; and a log preserving part which preserves the log information acquired by the log acquiring part.

An image forming system of the present disclosure has an image forming apparatus and a terminal for remote maintenance of the image forming apparatus, including: the image forming apparatus includes a connecting part that connects with the terminal in a session of a specific protocol, an operation acquiring part that acquires operational information corresponding to operation of the terminal connected by the connecting part, a log acquiring part that acquires log information from the terminal in the same session as operational information acquired by the operation acquiring part, and a log preserving part that preserves the log information acquired by the log acquiring part; and the terminal includes an operation transmitting part that transmits pointer data about movement and depression of a pointer on an image emulated an operation panel of the image forming apparatus displayed on a web browser to the image forming apparatus in the session as the operational information, and a log transmitting part that transmits extended data with an attribute other than the pointer data transmitted by the operation transmitting part to the image forming apparatus as the log information.

An communication processing method of the present disclosure is a communication processing method executed by an image forming apparatus capable of communicating with a terminal, including the steps of: connecting with a terminal for remote maintenance in a session of a specific protocol; acquiring operational information corresponding to operation of connected terminal; acquiring log information from the terminal in the same session as operational information; and preserving acquired log information.

DETAILED DESCRIPTION

Embodiment

[System Configuration of Image Forming System X]

Figure 1:
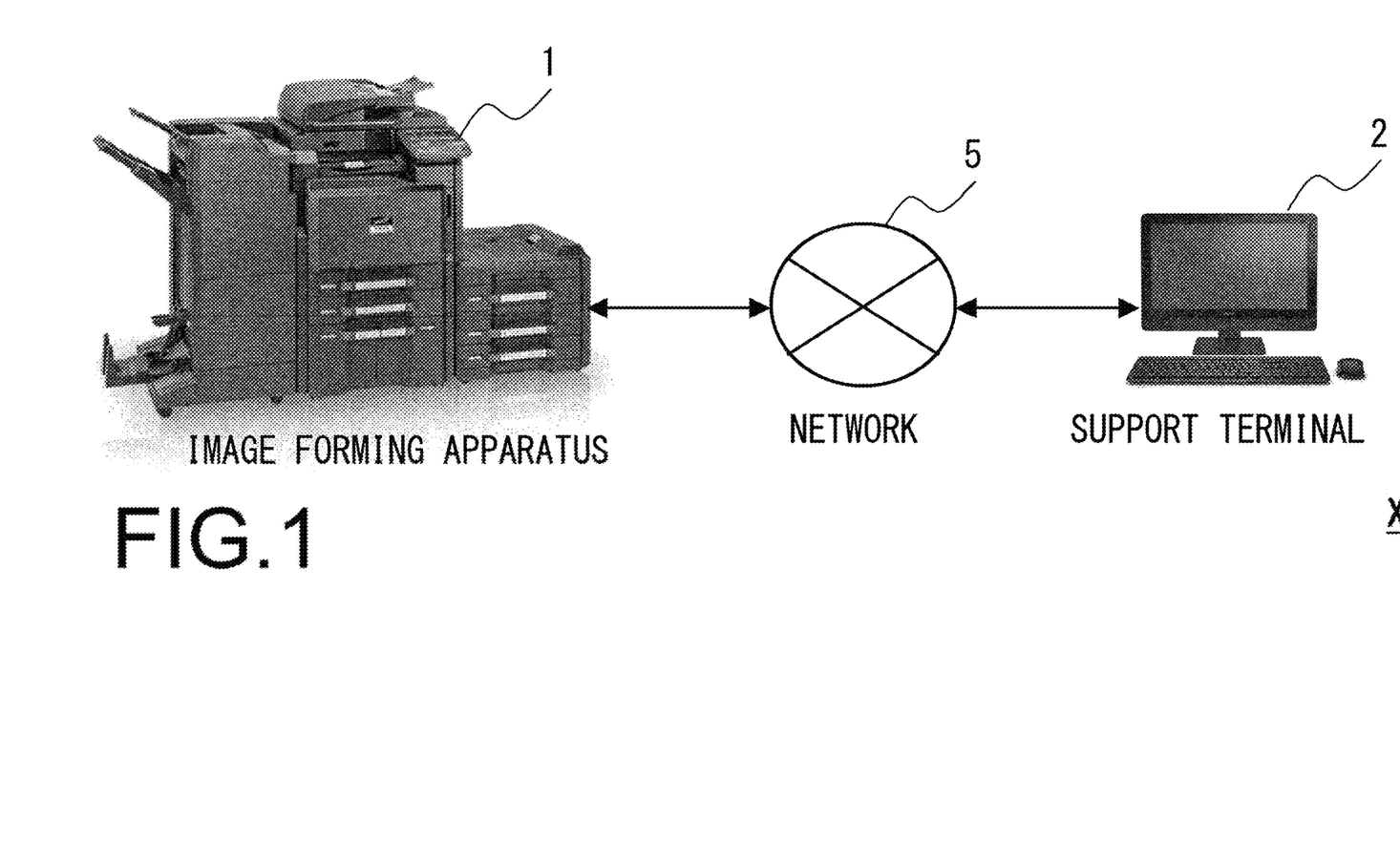
FIG. 1 is a system configuration figure of the image forming system according to an embodiment of the present disclosure.
Figure 2:
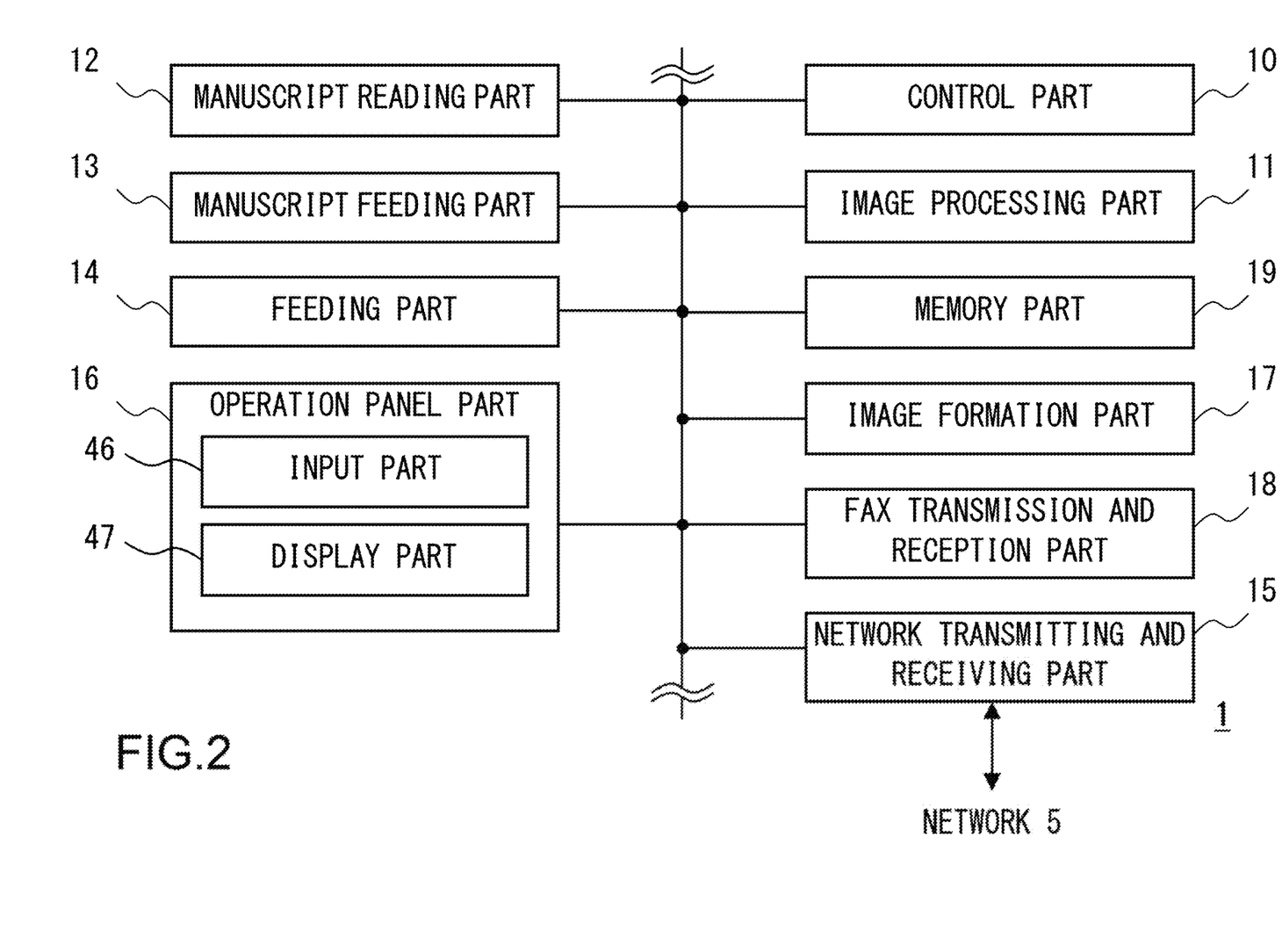
FIG. 2 is a block diagram showing a control configuration of the image forming apparatus as shown in FIG. 1.
Figure 3:
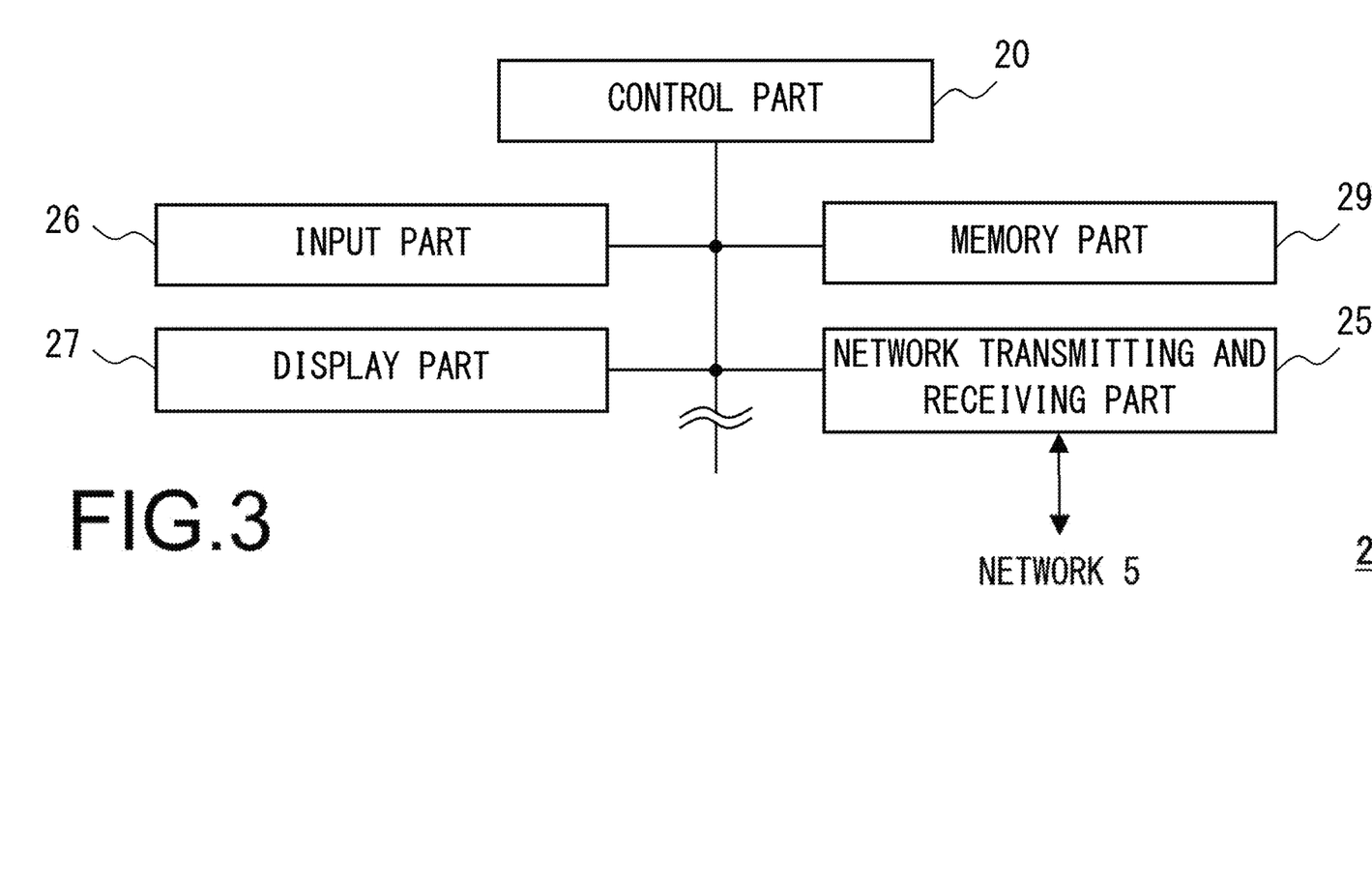
FIG. 3 is a block diagram showing a control configuration of the support terminal as shown in FIG. 1.

Firstly, as refer to FIG. 1-FIG. 3, the system configuration of image forming system X according to the embodiment of the present disclosure is explained.

According to FIG. 1, image forming system X according to the embodiment of the present disclosure includes image forming apparatus 1 and support terminal 2 for remote maintenance of image forming apparatus 1. Also, each apparatus is connected with network 5.

Image forming apparatus 1 is information processing apparatus, such as an MFP, a network scanner, a document scanner, network FAX, a printer, or the like. Also, image forming apparatus 1 can perform copying a document, printing, scanning, transmitting facsimile, or the like.

Also, in image forming apparatus 1 in the present embodiment, remote maintenance between remote places via network 5 is available. In service of the remote maintenance, an IT administrator, or the like, who is a customer, is in the side of image forming apparatus 1, and he or she perform maintenance by receiving instructions from a support personnel.

Support terminal 2 is PC, a mobile phone, a smart phone, PDA (Personal Data Assistant), a business-use support terminal, a dedicated terminal, or the like. Also, in support terminal 2, a kind of general-purpose OS (Operating System), or the like, is executed. Also, support terminal 2 can install a various application software (henceforth, an "application").

Also, support terminal 2 is a terminal for remote maintenance. The support personnel of the remote maintenance service as mentioned above use support terminal 2 and instructs to the IT administrator, or the like, for image forming apparatus 1. In this case, support terminal 2 displays a screen just emulated operation panel part 16 (FIG. 2) in image forming apparatus 1 and indicates various instructions on the screen. The contents of instructions by the support personnel via the screen are reflected on display part 47, or the like, in image forming apparatus 1. Also, image forming apparatus 1 is controlled corresponding to the button on the screen.

That is, in the present embodiment, the support may be performed with one to one communication by using function as a remote desktop function provided in an OS of a common PC. Therefore, for example, a RFB server, or the like is executed in image forming apparatus 1, and an RFB client is executed in support terminal 2. Also, support terminal 2 may execute the RFB client by using Java Script®, or the like. In this case, the image emulated operation panel part 16 can be displayed on support terminal 2, and image forming apparatus 1 can be controlled based on the displayed image. That is, support terminal 2 displays the emulated screen as a "remote panel" by using a web browser, and it can control image forming apparatus 1. In detail, it is possible to use functions, such as a print, a scan, FAX transmission and reception, and network FAX, in image forming apparatus 1 with instructions by the support personnel from support terminal 2. By using these functions, it becomes possible to check and to show solution of a problem situation for a customer's image forming apparatus 1 from a remote environment.

Network 5 is, in the present embodiment, LAN (Local Area Network), such as intranet, or the like, or WAN (Wide Area Network), such as the Internet, a mobile phone network, or the like. In case that network 5 is WAN, it connects with other servers via a router, a gateway, or the like. Also, network 5 may configure VPN (Virtual Private Network).

In addition, in image forming system X, it may include a plurality of image forming apparatuses 1 and support terminals 2, respectively.

(Configuration of Image Forming Apparatus 1)

Then, as refer to FIG. 2, a configuration of image forming apparatus 1 according to the embodiment of the present disclosure is explained. Image forming apparatus 1 may include image processing part 11, manuscript reading part 12, manuscript feeding part 13, feeding part 14, network transmitting and receiving part 15, operation panel part 16, image formation part 17 (image forming unit), FAX transmission and reception part 18, memory part 19, or the like. Each part is connected to control part 10, and these operations are controlled by control part 10.

Control part 10 is an information processing part, such as GPP (General Purpose Processor), CPU (Central Processing Unit), MPU (Micro Processing Unit), DSP (Digital Signal Processor), GPU (Graphics Processing Unit), ASIC (Application Specific Processor), or the like. Control part 10 reads the control program stored in ROM or HDD of memory part 19, expands to RAM, executes the control program, and is operated as each part of a functional block as described later. Also, control part 10 controls a whole device corresponding to specified instructions information inputted from support terminal 2 or operation panel part 16.

Image processing part 11 is a control arithmetic unit, such as DSP (Digital Signal Processor) or GPU (Graphics Processing Unit), or the like. Image processing part 11 performs specified image processing for image data. For example, the specified image processing may be a process of scaling, concentration tuning, tone adjustment, an image improvement, or the like. Also, image processing part 11 stores the image read by manuscript reading part 12 as print data in memory part 19. In this case, image processing part 11 can also convert print data into an electronic filing documents, such as PDF, or the like, or a file of an image data, such as TIFF, or the like. Also, image processing part 11 may be able to execute at least a part of a process of OCR (Optical Character Recognition).

Manuscript reading part 12 reads a set manuscript. Manuscript reading part 12 is arranged on the upper part of the body part of image forming apparatus 1. Manuscript reading part 12 is provided with a scanner, platen glass, and a manuscript reading slit. Manuscript reading part 12 moves the scanner to the position that faces the platen glass when reading the manuscript placed on the platen glass. Manuscript reading part 12 is read the manuscript placed on the platen glass with scanning and acquires image data. Manuscript reading part 12 outputs the acquired image data to control part 10.

Also, manuscript reading part 12 moves the scanner to the position which faces a manuscript reading slit when reading the manuscript fed from manuscript feeding part 13. Then, via the manuscript reading slit, manuscript reading part 12 reads the manuscript synchronizing with conveyance operation of the manuscript by manuscript feeding part 13, and it acquires image data. Manuscript reading part 12 outputs the acquired image data to control part 10.

Manuscript feeding part 13 conveys the manuscript read by manuscript reading part 12. Manuscript feeding part 13 is arranged on the upper part of manuscript reading part 12. Manuscript feeding part 13 is provided with a manuscript mounting part and a manuscript transport mechanism. Manuscript feeding part 13 feeds out the manuscript placed on the manuscript mounting part one sheet at a time by using the manuscript transport mechanism, and it feeds to manuscript reading part 12.

Feeding part 14 feeds out a recording paper one sheet at a time to image formation part 17. Feeding part 14 is provided in the body part.

Network transmitting and receiving part 15 is a network connection part including a LAN board, a wireless transceiver, or the like, for connecting with external networks, such as LAN, wireless LAN, WAN, the mobile phone network, or the like. Network transmitting and receiving part 15 transmits and receives data by using a line for data communications, and transmits and receives an audio signal by using a voice call line.

Operation panel part 16 is arranged in front-side of image forming apparatus 1. Also, operation panel part 16 includes input part 46 and display part 47.

Input part 46 is an input unit of a touch panel, physical buttons, or the like, which acquires the instructions by IT administrator, or the like, to image forming apparatus 1. Input part 46 may include buttons, such as a start, a stop, a reset, a copy, a transmission, and a FAX, or the like, to instruct for calling various functions. Also, input part 46 may include a physical numeric keypad, a "# Keys" button for displaying a numeric keypad on display part 47, a "home" button for returning to the "home" screen that is the first screen, or the like. Also, input part 46 may include various buttons, such as an "Interrupt" of a job, an "Authentication/Logout," an "Energy saver," or the like. Also, input part 46 may include buttons for making a various state of performing an instruction about the job change, such as an "Accessibility Display," a "Status/Job cancel," a "System Menu/Counter," or the like. Also, the job to be instructed may be types, such as printing, transmitting, storing, and recording for a selected document.

In addition, it is also possible to input and change each user's information with a user's instructions acquired from input part 46. Also, input part 46 can connect a reader for a magnetic card or an IC card, a device for biometric authentication, or the like.

Display part 47 includes a display panel, such as LCD (Liquid Crystal Display), an organic EL display, and an indicator, such as LED (Light Emitting Diode), or the like. The display panel of display part 47 can display a various operation screens of GUI (Graphical User Interface). In the present embodiment, input part 46 and display part 47 may be combined and configured as like a display having a touch panel. Therefore, it is also possible to arrange buttons for various operations on display part 47 and is instructed via input part 46 by depressing them. Also, as above-mentioned, it is possible to display a numeric keypad on display part 47. Also, LED of display part 47 can display various states. Also, LED can display the various states of the self-apparatus. Also, some of LED, or the like, for display part 47 may be provided inside of the button. Thereby, it can inspect a state of depression of the button, or the like.

Also, operation panel part 16 may be provided with a connecting part that connects with an external record medium, such as flash memory card, a USB storage apparatus, or the like.

Image formation part 17 makes the image formation from the data stored in memory part 19, read by manuscript reading part 12, or acquired from the external support terminal by a user's output instruction to a recording paper perform. Image formation part 17 is provided with a photo conductor drum, an exposure part, a developing part, a transfer part, a fixing part, or the like. Image formation part 17 records a toner image on a recording paper by performing an image formation process of electrification, exposure, development, transfer, and fixing.

FAX transmission and reception part 18 transmits and receives a facsimile. FAX transmission and reception part 18 can perform facsimile receiving from other FAX equipment via a voice line, can preserve it on memory part 19, and can perform image formation by image formation part 17. Also, FAX transmission and reception part 18 converts the manuscript read by manuscript reading part 12, the data of network FAX transmitted from the external support terminal into image data. FAX transmission and reception part 18 can perform facsimile transmission of the image data to other FAX equipment via a voice line.

Memory part 19 is a memory part having a non-transitory recording medium. Memory part 19 may include, for example, semiconductor memory, such as ROM (Read Only Memory), RAM (Random Access Memory), or the like, or HDD (Hard Disk Drive), or the like. RAM of memory part 19 may be held a memory content in a power-saving state by self refreshing function, or the like. The control program for operation-controlling image forming apparatus 1 is stored in ROM or HDD of memory part 19. The control program may be an OS and various applications. In addition, memory part 19 may also store user account settings. Also, an area of a storage folder (Document box) for each user may be included in memory part 19.

In addition, image forming apparatus 1, control part 10 and image processing part 11 may be integrally-formed as like CPU with built-in GPU, a chip-on module package, SOC (System On Chip), or the like. Also, control part 10 and image processing part 11 may contain RAM, ROM, a flash memory, or the like.

(Configuration of Support Terminal 2)

Also, according to FIG. 3, support terminal 2 is provided with control part 20, network transmitting and receiving part 25, input part 26, display part 27, memory part 29, or the like.

Control part 20 may be an information processing part, such as GPP (General Purpose Processor), CPU (Central Processing Unit), MPU (Micro Processing Unit), DSP (Digital Signal Processor), GPU (Graphics Processing Unit), ASIC (Application Specific Processor, processor for particular applications), or the like.

Input part 26 is a keyboard, various sensors, a pointing device, or the like, for acquiring the various instructions by a user. The pointing device includes a touch panel, a digitizer, a touchpad, or the like. Input part 26 can make various instructions input by a user, such as the support personnel, or the like, by using GUI (Graphical User Interface) of OS and can acquire this. Also, information of moving the pointer and depressing a key (physical key) of the keyboard in input part 26 is transmitted to image forming apparatus 1. That is, the display of display part 27 explained below is updated based on this information.

Display part 27 includes a flat-panel screen panel, such as LCD, an organic EL display, a FED (Field Emission Display), a fluorescent character display tube, or the like, a projector, LED for a status display, or the like. Display part 27 can display various operation screens according with GUI. In addition, input part 26 and display part 27 may be integrally-formed as like a display with the touch panel or the digitizer.

Network transmitting and receiving part 25 is a network connection part including a LAN board, a wireless transceiver, or the like, for connecting with network 5.

Memory part 29 is a memory part having a non-transitory recording medium. Memory part 29, for example, may include various RAM as a main memory part. Also, memory part 29, for example, may include ROM, eMMC (embedded Multi Media Card), SSD (Solid State Drive), HDD, or the like as an auxiliary memory part. Also, memory part 29 stores a control program for the self-apparatus. The control program may be various OS, a web browser that can browse webs, such as WWW, or the like, various applications, or the like. Also, memory part 29 may include external storages, such as various flash memories, optical recording media, or the like.

[Functional Configuration of Image Forming System X]

Figure 4:
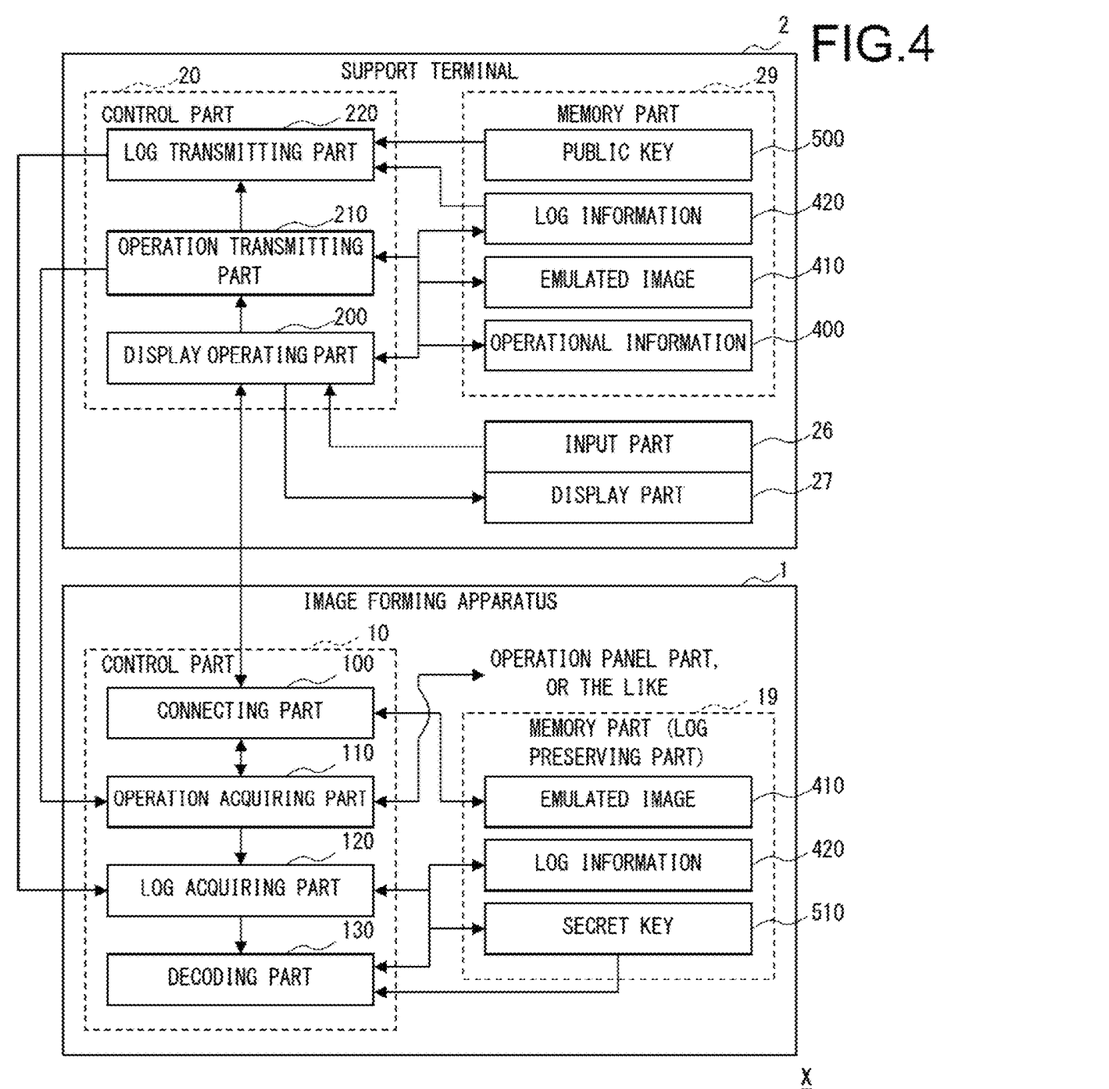
FIG. 4 is a block diagram showing a functional configuration of the image forming system according to the embodiment of the present disclosure.

Here, as refer to FIG. 4, a functional configuration of image forming system X in the present embodiment is explained. Control part 10 in image forming apparatus 1 includes connecting part 100, operation acquiring part 110, log acquiring part 120, and decoding part 130. Memory part 19 in image forming apparatus 1 stores operational information 400, emulated image 410, log information 420, and public key 500. Control part 20 in support terminal 2 includes display operating part 200, operation transmitting part 210, and log transmitting part 220. Memory part 29 in support terminal 2 stores emulated image 410, log information 420, and secret key 510.

Connecting part 100 connects with support terminal 2 in a session of a specific protocol. The specific protocol may be a protocol extended from the RFB protocol. In this case, connecting part 100 may execute a program compatible with the RFB server. Also, connecting part 100 can transmit emulated image 410 to support terminal 2 according to the instructions from operation acquiring part 110. The transmission may be executed as corresponded to the RFB protocol.

Operation acquiring part 110 acquires operational information 400 corresponding to operation of support terminal 2 connected by connecting part 100. Also, operation acquiring part 110 interprets operational information 400, updates display part 47 of operation panel part 16, and generates and updates emulated image 410 corresponding to this. In this case, operation acquiring part 110 may generate and update emulated image 410 based on states of a display panel, LED, or the like, in display part 47.

Log acquiring part 120 acquires log information 420 from support terminal 2 in the same session as operational information 400 by operation acquiring part 110. Also, log acquiring part 120 may select and acquire log information 420 from extended data with attributes other than the pointer data acquired from support terminal 2 in the session connected by connecting part 100.

Also, in the present embodiment, memory part 19 functions as a log preserving part that preserves log information 420 acquired by log acquiring part 120.

Decoding part 130 decodes log information 420 with secret key 510 corresponding to public key 500. Decoding part 130 may decode log information 420 acquired by log acquiring part 120 with a hash function, or the like.

Display operating part 200 connects with connecting part 100 in image forming apparatus 1. In the present embodiment, display operating part 200 may connect with connecting part 100 with the protocol extended from the RFB protocol. In this case, display operating part 200 may execute the "remote panel," which is a program compatible with the RFB client for image forming apparatus 1. Also, display operating part 200 acquires emulated image 410 from above-mentioned connecting part 100 in image forming apparatus 1 and displays it on display part 27. Also, display operating part 200 may execute the remote panel on the web browser in support terminal 2 by using Java Script®, or the like. The program compatible with the RFB client is acquired by connecting with the web server in image forming apparatus 1 or, otherwise, it may be acquired by accessing a web site of a server for a support. Thereby, without prior-installation the dedicated application, and it becomes possible to use the remote panel.

In addition, display operating part 200 does not need to generate "local storage" in support terminal 2 when operating the remote panel on the web browser because of a security reason. In this case, preserving log information 420 in the web browser may not be performed.

Operation transmitting part 210 acquires various instructions of the support personnel on the remote panel and transmits them to image forming apparatus 1. In detail, in the present embodiment, operation transmitting part 210 acquires pointer data about movement and depression of the pointer in emulated image 410 rendered on display part 27. Further, operation transmitting part 210 transmits the pointer data as operational information 400 to image forming apparatus 1 in the session. Also, operation transmitting part 210 can acquire the pointer data having for an area of the physical buttons of operation panel part 16 on emulated image 410.

Log transmitting part 220 encrypts and transmits log information 420 in public key encryption by using public key 500, or the like. In this case, log transmitting part 220 may encrypt log information 420 by a hash function or the like. Also, log transmitting part 220 may delete log information 420 in memory part 29 after completion of transmission or end of connection for the session, or the like.

Operational information 400 is information for an operation by the support personnel in the remote panel. In detail, operational information 400 may include the pointer data about movement and depression of the pointer in emulated image 410, or the like. Also, operational information 400 may include the information of depression of a button as the pointer data. As information of depression of the button, the information of depression for a physical key in input part 26 may be included. The information of depression for the physical key may be acquired as like the information of depression of the button drawn on emulated image 410 as corresponded to a short-cut key, or the like.

Emulated image 410 is an image data of emulated operation panel part 16 for image forming apparatus 1 displayed on the web browser. Emulated image 410 may also include an image that emulates an appearance of input part 46 and display part 47 of operation panel part 16. Also, emulated image 410 is a dot matrix image corresponding to the RFB protocol and may be partially- or entirely-updateable on image forming apparatus 1 and support terminal 2. The detailed example of emulated image 410 is described later.

Log information 420 is information of the log encrypted and transmitted from support terminal 2 with public key 500. Log information 420 may corresponds to, for example, a message of communication error of the session, or the like, acquired on support terminal 2, environment information of support terminals 2, environment information of the self-apparatus, or the like. As the environment information, it may be information of a version or a name of OS, or the like, information of the web browser, information of country or area, configuration information of the self-apparatus, or the like. Also, in log information 420, apparatus information, failure information, present-state information, or the like, for image forming apparatus 1 may be included. Also, log information 420 may be transmitted and received as extended data having attributes other than the pointer data acquired by operation transmitting part 210. Also, log information 420 does not need to be preserved on support terminal 2.

Public key 500 is a key of public key encryption, or the like. Public key 500 may be used for the hash function, or the like, for encrypting log information 420 on support terminal 2.

Secret key 510 is a secret key for decoding log information 420, or the like. Secret key 510 may be secret key information corresponding to public key 500. Also, secret key 510 may be stored only in the same type of apparatus such as image forming apparatus 1, or the like. That is, log information 420 may be decoded on image forming apparatus 1.

(Screen Example of Emulated Image 410)

Figure 5:
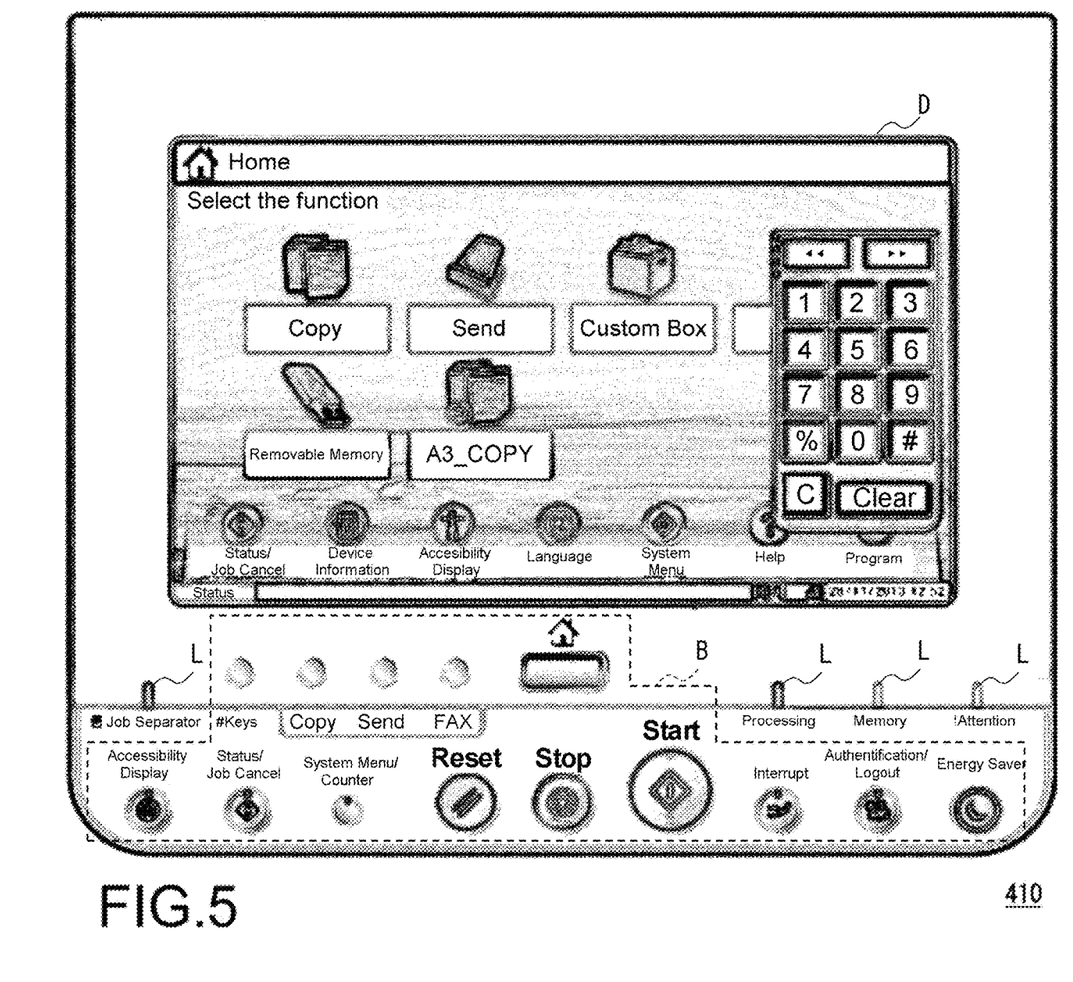
FIG. 5 shows a screen example of the emulated image shown in FIG. 4.

Here, as refer to FIG. 5, a screen example of emulated image 410 is explained. Emulated image 410 in the present embodiment includes, for example, panel D, which is an image of an area emulated the display panel of display part 47. Also, emulated image 410 includes button group B that shows the various buttons corresponding to input part 46 of image forming apparatus 1. That is, button group B is an image of the area emulated physical buttons, which is in the area other than the display panel of display part 47 of operation panel part 16 in image forming apparatus 1. Also, emulated image 410 includes image of indicator L, which is emulated LED, or the like. The image of these areas may be updated by operation of the support personnel. The support personnel control image forming apparatus 1 by depressing each button of panel D and button group B on emulated image 410. The control result is reflected in panel D and indicator L by using emulated image 410 acquired from image forming apparatus 1.

Here, control part 10 of image forming apparatus 1 functions as connecting part 100, operation acquiring part 110, log acquiring part 120, and decoding part 130 by executing the control program stored in memory part 19. Also, control part 20 of support terminal 2 is functioned as display operating part 200, operation transmitting part 210, and log transmitting part 220 by executing the control program stored in memory part 29.

Also, each part of the above-mentioned image forming apparatus 1 and support terminal 2 serves as hardware resources to execute the communication processing method in the present disclosure. In addition, the above-mentioned part or arbitrary combination of a functional configuration may be configured as in hardware with an IC, a programmable logic, FPGA (Field Programmable Gate Array), or the like.

[Log Preserving Process in Image Forming System X]

Figure 6:
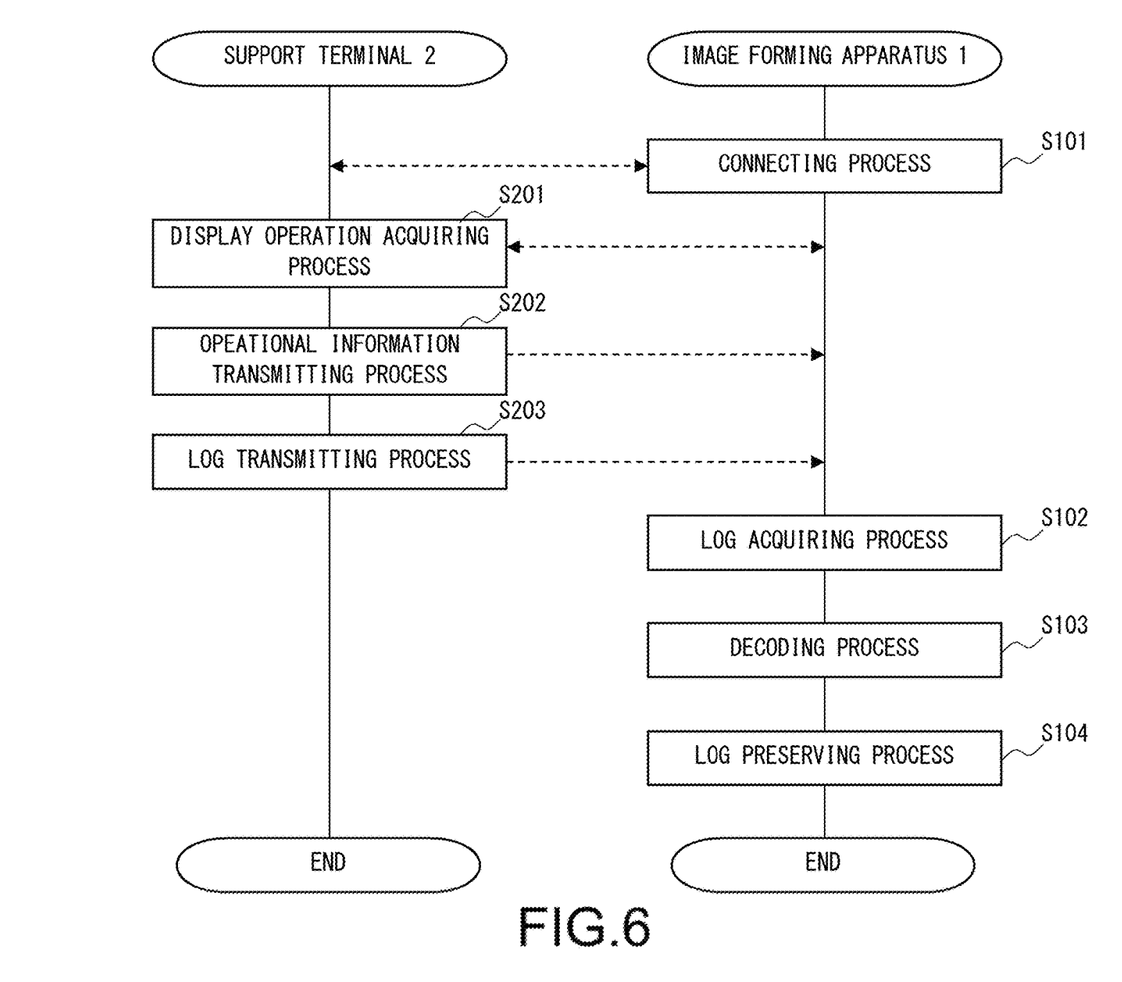
FIG. 6 is a flow chart of a log preserving process according to the embodiment of the present disclosure.

Then, as refer to FIG. 6, the log preserving process in image forming system X according to the embodiment of the present disclosure is explained. In the log preserving process of the present embodiment, mainly, control part 10 of image forming apparatus 1 executes the control program stored in memory part 19, control part 20 of support terminal 2 executes the control program stored in memory part 29, and they collaborate with each part by using the hardware resources. In the following, as refer to the flow chart in FIG. 6, the details of the log preserving process in the present embodiment are explained as for each step.

(Step S101)

Firstly, connecting part 100 of image forming apparatus 1 performs a connecting process. The IT administrator, or the like, uses service of remote maintenance in time of problem solving or training of image forming apparatus 1, or the like. In this case, IT administrator, or the like, may also possibly receive and answer by voice message, directly, with the support personnel in the support terminal 2 by using a voice line, or the like, connected with the image forming apparatus 1. The support personnel may communicate that starting remote maintenance by using the remote panel function of image forming apparatus 1 is desired. Then, IT administrator, or the like, instructs to execute the remote panel as remote maintenance by using operation panel part 16 in image forming apparatus 1, or the like. Thereby, connecting part 100 connects with support terminal 2 in a session of the specific protocol, such as a protocol extended from the RFB protocol. In this case, connecting part 100 executes a program compatible with the RFB server.

Also, in this case, display operating part 200 in support terminal 2 acquires, for example, communication error of the session, an environment information of support terminal 2, an environment information of the self-apparatus, or the like, as log information 420, and stores it in memory part 29, temporarily.

(Step S201)

Here, display operating part 200 in support terminal 2 performs a display operation acquiring process. The support personnel of support terminal 2 starts the web browser and executes the "remote panel" that is a program compatible with the RFB client. Thereby, display operating part 200 connects with connecting part 100 in image forming apparatus 1 with the protocol extended from the RFB protocol. Thereby, emulated image 410 is displayed on the web browser, and it is enabled of movement, depression of the pointer, or the like, by input part 26.

(Step S202)

Then, operation transmitting part 210 performs an operational information transmitting process. Operation transmitting part 210 acquires rectangle coordinates of the pointer moved in emulated image 410 on the web browser as the pointer data. Also, operation transmitting part 210 acquires information of depression of a button or a physical key and adds it to the pointer data, too. Operation transmitting part 210 transmits the pointer data as operational information 400 to image forming apparatus 1.

(Step S203)

Then, log transmitting part 220 performs a log transmitting process. Log transmitting part 220 encrypts log information 420 with public key 500 and transmits it. After that, log transmitting part 220 may delete log information 420 in memory part 29.

(Step S102)

Here, log acquiring part 120 of image forming apparatus 1 performs a log acquiring process. Log acquiring part 120 acquires log information 420 from support terminal 2 in the session connected by connecting part 100. That is, log acquiring part 120 receives log information 420 in the same session as operational information 400. In this case, log information 420 may be transmitted as extended data. The extended data may be data in which attributes other than the attribute of the standard RFB protocol including the pointer data are set up. Also, log information 420 may still be encrypted in the state at the time of receiving.

(Step S103)

Then, decoding part 130 performs a decoding process. Decoding part 130 decodes encrypted log information 420 with reference to secret key 510 stored in memory part 19. In addition, log information 420 may be preserved in the state where decoding by decoding part 130 has not been performed.

(Step S104)

Then, log acquiring part 120 performs a log preserving process. Log acquiring part 120 stores decoded log information 420 in memory part 19, which is a log preserving part. Thereby, log information 420 is preserved in memory part 19. If, for example, the operation of the remote panel has problem or there is a problem of connection, the preserved log information 420 may be acquired and perused. Therefore, log information 420 decoded with secret key 510 may be perused by operation panel part 16 in image forming apparatus 1. Also, log information 420 may be preserved in flash memory card, a USB memory, or the like, by the support personnel, a service person, a developer of remote maintenance service, or the like. Also, log information 420 can be sent to a server, or the like, separately. Thereby, it can contribute to improvement of the remote panel, or the like.

As above-mentioned, the log preserving process according to the embodiment of the present disclosure is ended.

The following effects can be obtained with constituting as mentioned above. In typical technology, about a program working on a web browser, it is difficult to set up local storage, or the like, because of a security reason. That is, in a remote panel of an image forming system, a log file, or the like, cannot be generated on support terminal in which the web browser works. Therefore, in typical technology, image forming apparatus cannot acquire log information. As a result, a support personnel has difficulty for investigating problem when the problem occurs in the remote panel. On the other hand, image forming apparatus X according to the embodiment in the present disclosure is an image forming system including image forming apparatus 1 and support terminal 2 for remote maintenance of image forming apparatus 1. Image forming apparatus 1 is provided with connecting part 100, operation acquiring part 110, log acquiring part 120, and memory part 19 as a log preserving part. Connecting part 100 connects with support terminal 2 in the session of a specific protocol. Operation acquiring part 110 acquires operational information 400 corresponding to operation of support terminal 2 connected by connecting part 100. Log acquiring part 120 acquires log information 420 from support terminal 2 in the same session as operational information 400 by operation acquiring part 110. The log preserving part preserves log information 420 acquired by log acquiring part 120. Support terminal 2 is provided with operation transmitting part 210 and log transmitting part 220. Operation transmitting part 210 transmits pointer data to image forming apparatus 1 as operational information 400 in the session. The pointer data is data about movement and depression of the pointer in emulated image 410 emulated on operation panel part 16 of image forming apparatus 1 and displayed on a web browser. Log transmitting part 220 transmits extended data as log information 420 to image forming apparatus 1. The extended data has attributes other than the pointer data acquired by operation transmitting part 210. As configured in this way, it can be provided image forming apparatus 1 that can acquire and preserve log information 420 for connection. Thereby, even if storing log information 420 in support terminal 2 is impossible, it can store log information 420 in image forming apparatus 1. Therefore, when the problem of connection of the remote panel occurs or a problem by the web browser, the environment of image forming apparatus 1, or the like, occurs, it becomes possible for the support personnel to perform problem investigation, easily. Also, because of acquiring log information 420 in addition to operational information 400, it is not necessary to add a communicative session between support terminal 2 and image forming apparatus 1. Therefore, connecting problems such as free ports by adding another session are eliminated.

Also, in image forming apparatus 1 according to the embodiment in the present disclosure, log information 420 may be encrypted and transmitted with public key 500 in support terminal 2. Also, image forming apparatus 1 is further provided with decoding part 130 that decodes log information 420 with secret key 510 corresponding to public key 500. As configured in this way, since log information 420 is encrypted by public key 500, and log information 420 can be analyzed only in the self-apparatus, which stores secret key 510. Thereby, even if some problems occur, only the support personnel, or the like, having the secrecy agreement can peruse log information 420. Therefore, the risk of information leakage can be reduced, and security can be enhanced.

Also, in image forming apparatus 1 according to the embodiment of the present disclosure, log information 420 may correspond to a communication error of the session acquired in support terminal 2, the environment information of support terminal 2, or environment information of the self-apparatus. As configured in this way, the support personnel can specify a problem, easily. That is, it becomes possible to analyze whether network 5 at the time of connection has a problem, other environment has a problem, or the like, by perusing the contents of the error of connection, or the like. Also, when there is an equivalent problem, the support personnel can support, easily, by accessing log information 420.

Also, in image forming apparatus 1 according to the embodiment of the present disclosure, a specific protocol may be a protocol extended from the RFB protocol. Also, operational information 400 may include pointer data. The pointer data is related with movement and depression of the pointer on emulated image 410 emulated the operation panel of the self-apparatus displayed on the web browser of support terminal 2. Also, log information 420 may be extended data with attributes other than pointer data. Also, log information 420 does not need to be preserved in support terminal 2. As configured in this way and as extended with compatibility of the specification of the RFB protocol, the framework that transmits log data by using the existing RFB communication session can be provided. Therefore, in support terminal 2, even if it is the VNC, or the like, which is a general RFB client, satisfactory communication is possible. Thereby, it becomes easy for the support personnel, or the like, to investigate the problem of connection. Also, it becomes possible to transmit not only operational information 400 but log information 420 within one session of the remote panel by using the extended RFB protocol. Therefore, if transmission and reception of operational information 400 are possible, log information 420 can be transmitted, certainly. Also, it becomes easier to investigate the problem.

OTHER EMBODIMENTS

In the above-mentioned embodiment, an example that executes the remote panel with the RFB protocol is explained. However, a remote panel may be performed with other original protocols, and the above-mentioned remote maintenance may be performed. Also, in an above-mentioned embodiment, an example that a program corresponding to an RFB client is executed on a web browser in support terminal 2 to perform the remote panel is explained. However, in support terminal 2, a dedicated application may be installed, and a remote panel may be performed. For example, emulated image 410 may be generated in image forming apparatus 1, without using VNC, or the like, the image may be pushed to the web browser or the dedicated application, serially, or streaming may be performed in support terminal 2. Also, contrary, in support terminal 2, an operation display program that generates emulated image 410 of image forming apparatus 1 corresponding to operation of the support personnel may be executed. In this case, by executing the operation display program, operational information 400 may be transmitted as well as the above-mentioned configuration, and image forming apparatus 1 may be controlled. Also, in this case, without transmitting the image data itself from image forming apparatus 1, only data required to generate emulated image 410, which is data related to a user file, or the like, may be transmitted. In addition, the operation display program may be a "real" emulator that executes the control program, which is similar program stored in memory part 19 in image forming apparatus 1, at support terminal 2. As configured in this way, a remote panel can be established even if an environment that the RFB protocol is unusable, for example, environment connectable only with the port of HTTP, or the like. Also, it is also possible to configure so as to compress the bandwidth of data related to transmission and reception of data.

Also, in the above-mentioned embodiment, it is mainly-disclosed an example that operation by the support personnel is reflected in displaying or controlling to image forming apparatus 1. However, the operation by IT administrator, or the like, to operation panel part 16 in image forming apparatus 1 may be reflected in controlling of emulated image 410 or image forming apparatus 1. Also, it is possible to configure that the reflected result may be transmitted to support terminal 2. Thereby, in addition to instruction and operation by the support personnel, corresponding to actual operation by IT administrator, emulated image 410 can be generated, or image forming apparatus 1 can be controlled. Therefore, an understanding of IT administrator in training, or the like, can be helped.

Also, in above-mentioned embodiment, it mainly explained an example that preserves log information 420 in image forming apparatus 1 as independent data. However, image forming apparatus 1 may store log information 420 so that it can be extracted as a part of another history or log for the self-apparatus. This makes it easier to investigate the problem by comparing with other states, or the like, in the image forming apparatus. Also, it becomes possible to acquire a history and a log in bundle by a server for management of remote maintenance, or the like. Thereby, it becomes easier for the support personnel, the service person, the developer of remote maintenance service, or the like, to utilize log information 420.

Also, the present disclosure is applicable to information processing apparatus other than the image forming apparatus. That is, it may be configured to use the network scanner, a server, or the like, which separately-connected with a scanner by USB, or the like.

Also, the configuration and operation of the above-mentioned embodiment are an example, and it cannot be overemphasized that it can change suitably and can execute in the range that does not deviate from the aim of the present disclosure.

What is claimed is:

1. An image forming apparatus comprising:
a connecting part configured to connect with a terminal for remote maintenance in a session of a specific protocol;
an operation acquiring part configured to acquire operational information corresponding to operation of the terminal connected by the connecting part;
a log acquiring part configured to acquire log information from the terminal in the same session as the operational information acquired by the operation acquiring part; and
a log preserving part configured to preserve the log information acquired by the log acquiring part, wherein
the log information corresponds to each of a communication error of the session, environment information of the terminal, and environment information of a self-apparatus.

2. The image forming apparatus according to claim 1, wherein
the log information is encrypted and transmitted by public key encryption at the terminal; and
the image forming apparatus further comprises a decoding part configured to decode the log information by a secret key code corresponding to the public key encryption.

3. The image forming apparatus according to claim 1, wherein
the log information corresponds to a communication error of the session, the environment information of the terminal, and/or environment information of a self-apparatus.

4. The image forming apparatus according to claim 1, wherein
the specific protocol is a protocol extended from an RFB protocol,
the operational information includes pointer data about movement and depression of a pointer on an image emulated on an operation panel of a self-apparatus displayed on a web browser of the terminal, and
the log information is extended data with an attribute other than the pointer data and is not preserved in the terminal.

5. The image forming apparatus of claim 2, wherein the log information is encrypted with the public key separately from other data of the session such that the operational information is not encrypted with the public key.

6. An image forming system having an image forming apparatus and a terminal for remote maintenance of the image forming apparatus, wherein:
the image forming apparatus includes
a connecting part configured to connect with the terminal in a session of a specific protocol,
an operation acquiring part configured to acquire operational information corresponding to operation of the terminal connected by the connecting part,
a log acquiring part configured to acquire log information from the terminal in the same session as operational information acquired by the operation acquiring part, and
a log preserving part configured to preserve the log information acquired by the log acquiring part;
the terminal includes
an operation transmitting part configured to transmit pointer data about movement and depression of a pointer on an image emulated an operation panel of the image forming apparatus displayed on a web browser to the image forming apparatus in the session as the operational information, and
a log transmitting part configured to transmit extended data with an attribute other than the pointer data transmitted by the operation transmitting part to the image forming apparatus as the log information; and
the log information corresponds to each of a communication error of the session, environment information of the terminal, and environment information of a self-apparatus.

7. The image forming system according to claim 6, wherein
the log transmitting part encrypts and transmits the log information in public key encryption; and
the image forming apparatus further includes
a decoding part configured to decode the log information in a secret key code corresponding to the public key encryption.

8. The image forming system of claim 7, wherein the log information is encrypted with the public key separately from other data of the session such that the operational information is not encrypted with the public key.

9. The image forming system according to claim 6, wherein
the log information corresponds to a communication error of the session, environment information of the terminal, and/or environment information of a self-apparatus.

10. The image forming system according to claim 6, wherein
the specific protocol is a protocol extended from an RFB protocol, and
the log information is not preserved in the terminal.

11. The image forming system of claim 6, wherein the log transmitting part deletes the log information after transmitting the log information.

12. A communication processing method executed by an image forming apparatus capable of communicating with a terminal, comprising the steps of:
connecting with the terminal for remote maintenance in a session of a specific protocol;
acquiring operational information corresponding to operation of connected terminal;
acquiring log information from the terminal in the same session as the operational information; and
preserving the acquired log information, wherein
the log information corresponds to each of a communication error of the session, environment information of the terminal, and environment information of a self-apparatus.

13. The communication processing method according to claim 12, wherein
the log information is encrypted and transmitted in public key encryption at the terminal, and the log information is decoded in a secret key code corresponding to the public key encryption.

14. The communication processing method of claim 13, wherein the log information is encrypted with the public key separately from other data of the session such that the operational information is not encrypted with the public key.

15. The communication processing method according to claim 12, wherein
the log information corresponds to a communication error of the session, environment information of the terminal, and/or environment information of a self-apparatus.

16. The communication processing method according to claim 12, wherein
the specific protocol is a protocol extended from an RFB protocol,
the operational information includes pointer data about movement and depression of a pointer on an image emulated an operation panel of a self-apparatus displayed on a web browser of the terminal, and
the log information is extended data with an attribute other than the image data and is not preserved in the terminal.

\* \* \* \* \*